United States Patent [19]

Silvey

[11] Patent Number: 5,765,848
[45] Date of Patent: Jun. 16, 1998

[54] TRAILER ACCESSORY FOR PROTECTABLY RECEIVING TRAILER PLUGS

[76] Inventor: Michael W. Silvey, 56261 Van Dyke, Shelby Township, Mich. 48316

[21] Appl. No.: 627,758

[22] Filed: Mar. 29, 1996

[51] Int. Cl.$^6$ ............................................. B60D 1/62
[52] U.S. Cl. ............................................. 280/422; 439/35
[58] Field of Search .................................. 280/422, 421; 439/34, 35, 36

[56] References Cited

U.S. PATENT DOCUMENTS

| | | | |
|---|---|---|---|
| 5,380,209 | 1/1995 | Converse et al. | 280/422 |
| 5,443,389 | 8/1995 | Hughes | 439/35 |
| 5,514,009 | 5/1996 | Hughes | 439/35 |
| 5,593,170 | 1/1997 | Chiu | 280/422 |
| 5,611,695 | 3/1997 | Bentley | 439/35 |
| 5,626,479 | 5/1997 | Hughes | 439/35 |

OTHER PUBLICATIONS

Trailer Plug Receiving Device for Trailers, manufactured by C&S Industries, 819 N. Van Dyke, Imlay City, MI 48444, believed dated around 1994.

*Primary Examiner*—Paul N. Dickson
*Attorney, Agent, or Firm*—Peter D. Keefe

[57] ABSTRACT

A trailer accessory which includes a boot having one or more plug receptacles for protectably receiving thereinside trailer plugs and further includes a base for connecting the boot to the tongue of a trailer as well as for holding the trailer chains. The boot is composed of a pliable thermoplastic rubber elastomer having form fitted plug receptacles for receiving therein respective trailer plugs for lighting and braking of the trailer. The base is composed of a tough, rigid and durable material, preferably plastic. The base has a central aperture for trappingly receiving by interference fit a foot of the boot and first and second outboard slots for receiving the end of the trailer chains. The base is secured to the tongue via a connection member including threaded fasteners which engage first and second end slots of a cross-bar and first and second inboard slots of the base, wherein the first and second end slots are sized and spaced similarly to that of the first and second inboard slots.

21 Claims, 2 Drawing Sheets

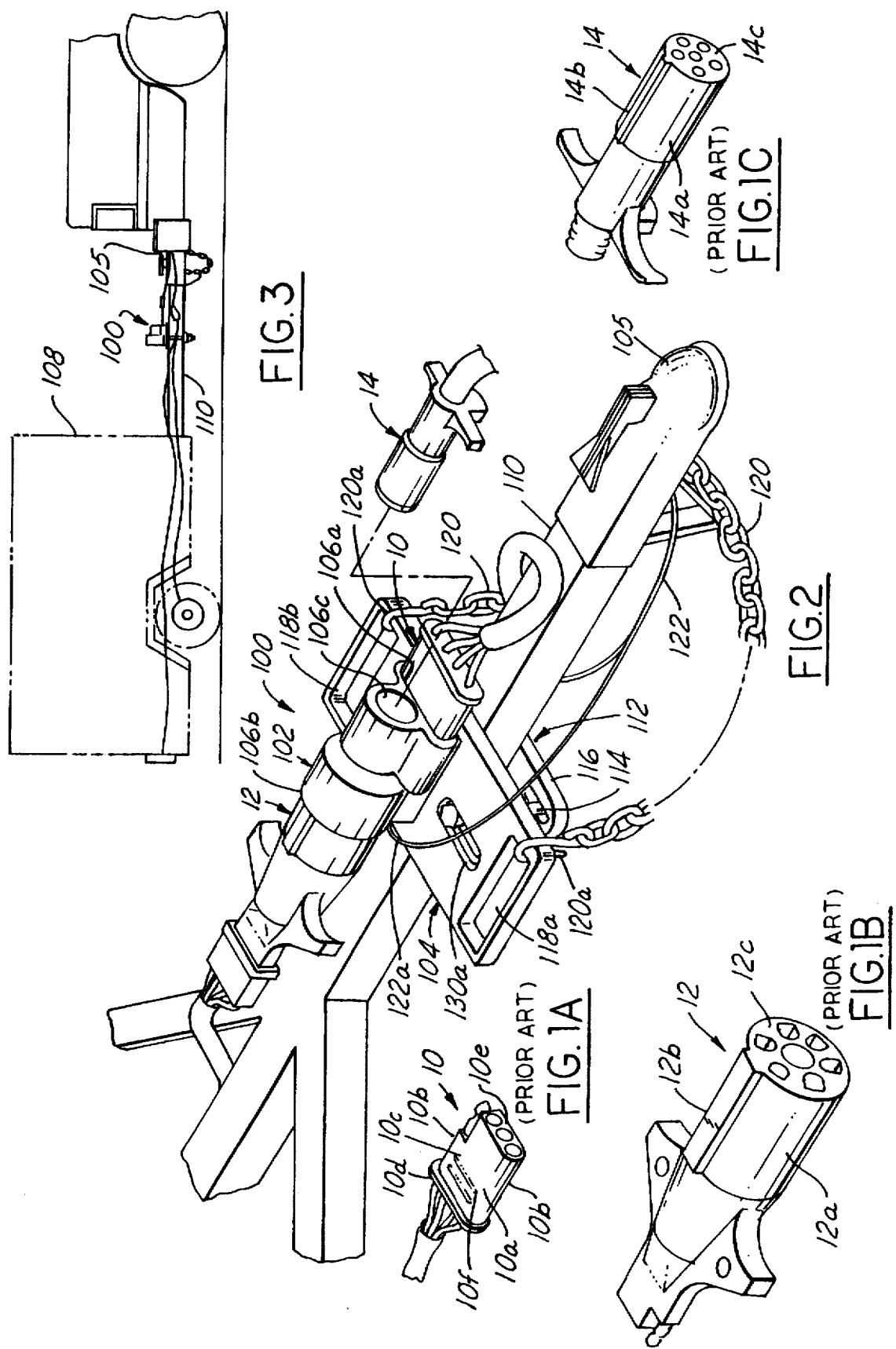

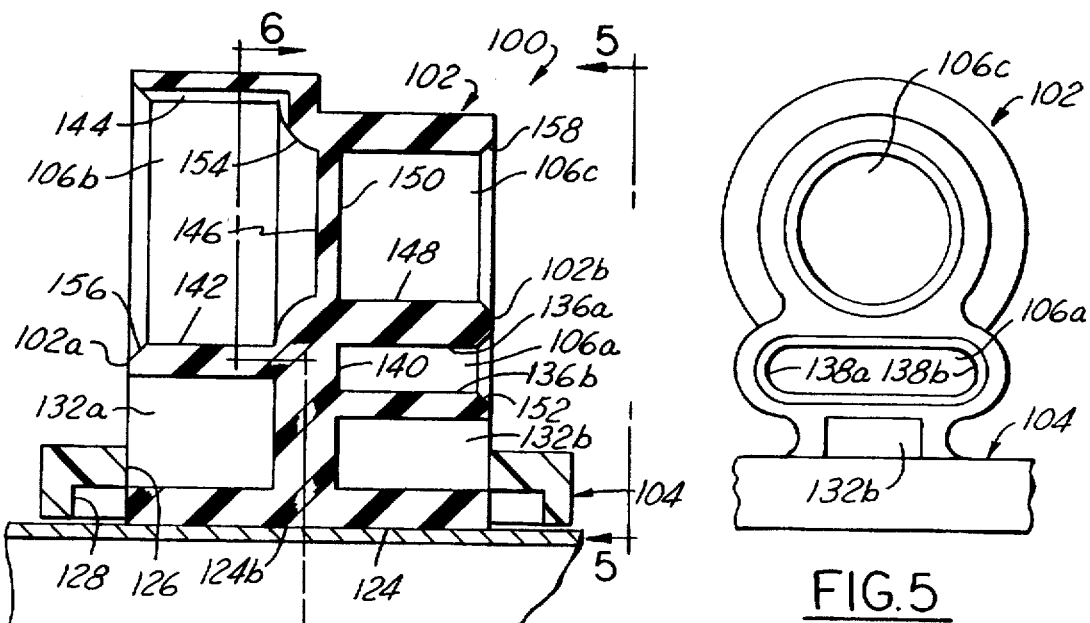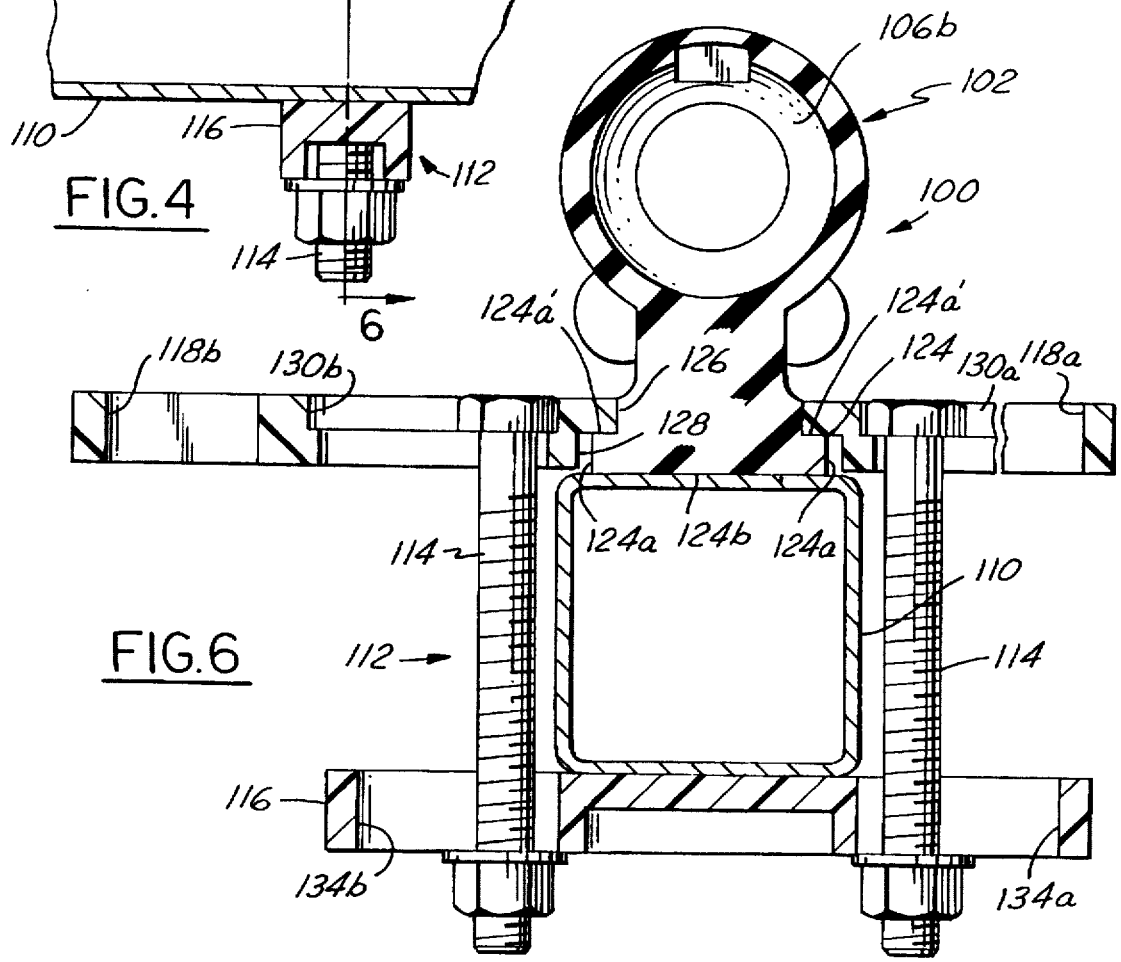

TRAILER ACCESSORY FOR PROTECTABLY RECEIVING TRAILER PLUGS

BACKGROUND OF THE INVENTION

1. Field of the Invention

The present invention relates to trailers towed by a motor vehicle, and more particularly to plugs used to releasably connect electrical lighting and brakes of the trailer to the motor vehicle. Still more particularly, the present invention is related to a trailer accessory including a boot for protectably receiving the plugs of the trailer when the trailer is not in use.

2. Description of the Prior Art

Trailers towed behind motor vehicles must have at a minimum lighting for braking indication, running lights and backing-up. Trailers are connected to the motor vehicle via a "ball" attached to the rear of the motor vehicle and a lever operated "socket" attached to a "tongue" protruding forwardly with respect to the trailer proper.

Power and control of trailer mounted lighting is supplied by the motor vehicle electrical system. In order for the trailer to be selectively separable from the motor vehicle and yet have connection to the motor vehicle electrical system, mutually interconnecting lighting plugs are utilized. A motor vehicle lighting plug is provided with the motor vehicle which is electrically connected with the electrical system of the motor vehicle. A trailer lighting plug 10 (shown in FIG. 1A) is provided with the trailer and is electrically connected with the lighting of the trailer. In operation, the driver of the motor vehicle mutually interconnects the motor vehicle and trailer lighting plugs to provide electrical connection between the motor vehicle and the trailer lighting.

Power and control for trailer brakes is supplied by the motor vehicle electrical system, which is usually modified in some manner to provide a braking signal to the trailer when the motor vehicle brakes are applied. In order for the trailer to be selectively separable from the motor vehicle and yet have connection to the motor vehicle electrical system, interconnecting brake plugs are utilized. A motor vehicle brake plug is provided with the motor vehicle which is electrically connected with the electrical system of the motor vehicle. A trailer brake plug is provided with the trailer and is electrically connected with the electrical brakes of the trailer. In operation, the driver of the motor vehicle mutually interconnects the motor vehicle and trailer brake plugs to provide electrical connection between the motor vehicle and the trailer brakes. As shown in FIG. 1B and 1C, two types of trailer brake plugs 12, 14 are in common use, one or the other of which being connected with a particular trailer.

Motor vehicle regulations further require that chains be interconnected between the trailer and the motor vehicle so that in the event the socket should become somehow disconnected from the ball, the trailer is kept attached to the motor vehicle by virtue of the trailer chains. The trailer chains are connected to the tongue near the socket and are provided usually with clip ends for being releasably interfaced with apertures associated with the motor vehicle, usually at the trailer hitch, which, itself, provides attachment of the ball to the motor vehicle.

Lastly, recent motor vehicle regulations now require an emergency brake cable (referred to generally in the art as a "break-away cable") be connected between the motor vehicle and the trailer, wherein should the socket become disconnected from the ball, the cable will be pulled, actuating a switch to an internal battery of the trailer which thereupon causes the trailer brakes to be applied automatically. Usually, the break-away cable has a looped end for being looped over the ball.

Problematically, trailers are frequently left unused for extended periods of time during which episodes the trailer plugs are subjected to environmentally induced degradation. Good electrical contact between the motor vehicle and trailer plugs is essential for trouble free electrical interconnection therebetween, and in this respect the motor vehicle plugs are typically stored inside the trunk, safely sheltered from the environment. However, the trailer plugs will quickly become dirty and corroded as time passes (be that daily or seasonally) with no provided shelter. Even if the trailer plugs are kept off the ground, weather will cause degradation, and insects may make nests in the female connectors thereof. Trailer plugs can be ruined very quickly should they be left to dangle onto the ground. Further, the chains and the break-away cable may become corroded or otherwise undesirably mired if left dangling upon the ground, and in the winter can become frozen to the ground (as can also become the fate of dangling trailer plugs).

Accordingly, what remains needed in the art is a simple, easy and reliable device for protecting the plugs, chains and emergency cable of a trailer when the trailer is not in use.

SUMMARY OF THE INVENTION

The present invention is a trailer accessory which includes a boot for protectably receiving therein trailer plugs and further includes a base for connecting the boot to the tongue of a trailer as well as for holding the trailer chains. Further, the break-away cable is loopably placeable upon the boot to keep it, too, up from the ground when the trailer is not in use.

The boot is composed of a pliable thermoplastic rubber elastomer having form fitted plug receptacles for receiving therein respective trailer plugs for lighting and braking of the trailer. In this regard, the elastomer pliably seals with respect to the sidewall of the trailer plug when the trailer plug is inserted into its respective plug receptacle, yet the pliability of the boot allows for easy insertion and removal of the trailer plug with respect to its plug receptacle. Preferably, three trailer plug receptacles are provided, one for a trailer lighting plug, one for a first type of trailer brake plug and one for a second type of trailer brake plug.

The base is composed of a tough, rigid and durable material, preferably plastic. The base has a central aperture for trappingly receiving by interference fit a foot of the boot and first and second outboard slots for receiving the end of the trailer chains.

The base is secured to the tongue via a connection member including threaded fasteners which engage first and second end slots of a cross-bar and first and second inboard slots of the base, wherein the first and second end slots are sized and spaced similarly to that of the first and second inboard slots.

In operation, the user clamps the base to the tongue of a trailer, spaced a convenient distance from the socket thereof, whereby the ends of the trailer chains are able to reach the first and second outboard slots. The trailer lighting plug is inserted into its respective lighting plug receptacle, and the trailer brake plug is inserted into its respective brake plug receptacle. The ends of the trailer chains are draped into, or clipped onto, respectively each of the outboard slots, and finally, the looped end of the break-away cable is looped over the boot.

Accordingly, it is an object of the present invention to provide a trailer accessory which protects the plugs of the trailer from environmental damage when the trailer is not in use.

It is an additional object of the present invention to provide a trailer accessory which protects the plugs of the trailer from environmental damage when the trailer is not in use, as well as provide provision for supporting the trailer chains and the break-away cable off from the ground when the trailer is not in use.

It is a further object of the present invention to provide a trailer accessory which protects the plugs of the trailer from environmental damage when the trailer is not in use, as well as provide provision for supporting the trailer chains and the break-away cable off from the ground when the trailer is not in use, wherein the trailer accessory is easily and securely mountable to the tongue of the trailer and the trailer accessory is easily and simply used.

These, and additional objects, advantages, features and benefits of the present invention will become apparent from the following specification.

BRIEF DESCRIPTION OF THE DRAWINGS

FIG. 1A is a perspective view of a prior art trailer lighting plug conventionally connected with respect to a trailer.

FIG. 1B is a perspective view of a first prior art trailer brake plug conventionally connected with respect to a trailer.

FIG. 1C is a perspective view of a second prior art trailer brake plug conventionally connected with respect to a trailer.

FIG. 2 is a perspective view of the trailer accessory according to the present invention, shown in operation with respect to a trailer tongue, a trailer lighting plug and at least one trailer brake plug.

FIG. 3 is a side view of a trailer and motor vehicle in a mutually interconnected configuration, wherein the trailer accessory is connected to the tongue of the trailer.

FIG. 4 is fragmented sectional view of the trailer accessory according to the present invention, wherein the trailer accessory is shown connected with a trailer tongue.

FIG. 5 is a fragmented front view of the trailer accessory according to the present invention, seen along line 5—5 in FIG. 4.

FIG. 6 is a fragmented partly sectional view of the trailer accessory according to the present invention, seen along line 6—6 in FIG. 4, wherein the trailer accessory is shown connected with a trailer tongue.

DETAILED DESCRIPTION OF THE PREFERRED EMBODIMENT

Referring now to the Drawing, FIG. 2 generally shows the trailer accessory 100 according to the present invention. The trailer accessory 100 includes a boot 102 and a base 104. The boot 102 has a selected number of plug receptacles (a first, second and third plug receptacle 106a, 106b, 106c being preferred) for protectively receiving thereinside a respective type of trailer plug 10, 12, 14 that is connected with the trailer 108 (see FIG. 3), as discussed hereinabove. The base 104 is connected to the tongue 110 of the trailer 108 via a connection member 112 preferably in the form of threaded fasteners 114 and a cross-bar 116 slidably engaged therewith. The base 104 is provided with first and second outboard slots 118a, 118b for respectively receiving an end 120a of each of the trailer chains 120.

The boot 102 is composed of a pliant and durable material which is able to withstand weather and ultraviolet light, for example a pliable thermoplastic rubber elastomer. A preferred material of the boot is SANTOPRENE, a registered trademark of Advanced Elastomer Systems of Akron, Ohio 44311, which materials are proprietary thermoplastic rubber products; the preferred product being identification number 121-58-W175. The base 104 is composed of a rigid, durable and weather resistant material, for example a plastic. A preferred material for the base is ZYTEL, a registered trademark of E. I. Du Pont de Nemours & Co. of Wilmington, Del., which material is a nylon resin. Each of the boot and base are formed preferably via molding processes well known in the plastic and elastomer arts.

In operation, a user slips one or more trailer plugs 10, 12, 14 into its respective appropriate first, second and third plug receptacle 106a, 106b, 106c. The user places the end 120a of the trailer chains 120 drapably into or clipably onto respective first and second outboard slots 118a, 118b. The loop end 122a of the break-away cable 122 is looped over the boot 102.

In order to better understand the structural configuration of the first, second and third plug receptacles 106a, 106b, 106c, the prior art trailer plugs 10, 12, 14 shown in FIGS. 1A, 1B and 1C will now be discussed with greater particularity.

It will be noted that the following features of the trailer plugs 10, 12 14 pertain: the trailer lighting plug 10 has a sidewall 10a having a thin, generally parallelepipedal shape, wherein the end faces 10b are convex and the side faces 10c slightly converge increasingly from the rear face 10d toward the front face 10e, and wherein a plurality of finger grip ridges 10f are located on the side faces 10c adjacent the rear end face 10d; the first type of trailer brake plug 12 has a sidewall 12a having a cylindrical shape defined by a first plug diameter, an axially oriented alignment tab 12b, and a front face 12c; and the second type of trailer brake plug 14 has a sidewall 14a having a cylindrical shape defined by a second plug diameter (the first plug diameter being larger than the second plug diameter), an axially oriented alignment tab 14b, and a front face 14c.

The first, second and third plug receptacles 106a, 106b, 106c of the boot 102 are structured to protectably receive, in a form fitting and sealing manner, the sidewall of its respective trailer plug 10, 12, 14. It is to be understood that the standards for trailer plugs may change in forthcoming years, and that the configuration of the plug receptacles 106a, 106b, 106c of the boot 102 would be adaptively changed by an artisan having ordinary skill in a commensurate manner consistent with the protective features herein described for the presently configured prior art trailer plugs 10, 12, 14.

As can be appreciated by reference to FIGS. 2 and 4, the preferred embodiment of the trailer accessory 100 involves the boot 102 being compactly configured, wherein: the second plug receptacle 106b (for protectably receiving therein the first type of trailer brake plug 12) is located at one side 102a of the boot 102; and at the opposite side 102b of the boot are located both the third plug receptacle 106c and the first plug receptacle 106a, wherein the second and third plug receptacles are generally axially aligned with respect to each other and the first plug receptacle is located between a foot 124 and the second plug receptacle, and wherein the first and third plug receptacles 16a, 106c are open in the same direction, which direction is opposite to the direction the second plug receptacle 106b is open.

As mentioned hereinabove and best seen in FIGS. 4 and 6, the boot 102 has an integral foot 124. The base 104 has a central aperture 126 into which the foot 124 is received. The foot 124 includes opposing overhang portions 124a which are oversized for the cross-section of the central aperture 126, so that when the foot is pressed in a pliably deformable manner through the central aperture, the overhangs interferingly trap the boot with respect to the base. The spacing between the bottom 124*b* of the foot 124 and the top 124*a'* of the overhangs is slightly greater than that of the recess 128 of the base into which the foot is received (that is, the bottom protrudes in relation to the base). Consequently, as the threaded fasteners 114 of the connection member 112 are tightened, the bottom 124*b* of the foot 124 is pressed against the tongue 110 before (or without) the base 104 touching the tongue. Since the bottom 124*a* of the foot 124 is securely pressed against the tongue 110, the non-slip property of the elastomeric material of the boot 102 aids in keeping the trailer accessory 100 located at a pre-set location on the tongue without excessive tightening of the threaded fasteners 114 being necessary.

The connection member 112 is structurally preferred to be as follows. The base 104 includes first and second inboard slots 130*a*, 130*b* into which the threaded fasteners 114 are received, preferably via interfering abutment with respect to a recessed lip of the first and second inboard slots. The preferred threaded fasteners are zinc plated bolts, washers and nuts. A cross-bar 116 is provided with first and second end slots 134*a*, 134*b* which are sized and spaced similarly to that of the first and second inboard slots 130*a*, 130*b*. A threaded fastener 114 is received in each of the first inboard slot 130*a* and the first end slot 134*a*, and the other threaded fastener 114 is received in each of the second inboard slot 130*b* and the second end slot 134*b*. As the threaded fasteners 114 are tightened, the cross-bar 116 presses against one side of the tongue 110 and the opposite side of the tongue presses against the bottom 124*b* of the foot 124.

Returning now to the boot 102, the structural features of the first, second and third plug receptacles 106*a*, 106*b*, 106*c* will be detailed with greater particularity.

The first plug receptacle 106*a* is preferred to have substantially planar and mutually parallel opposing sidewalls 136*a*, 136*b*, concave edgewalls 138*a*, 138*b*, and an endwall 140. With regard to the trailer lighting plug 10, the cross-sectional area of the first plug receptacle 106*a* is about that of the cross-sectional area of the sidewall 10*a* of the trailer lighting plug adjacent the rear face 10*d* thereof. In this regard, the finger grip ridges 10*f* cause the pliant material of the boot to be deformed as the trailer lighting plug is inserted into the first plug receptacle.

The second plug receptacle 106*b* is preferred to have a cylindrically shaped sidewall 142 defined by a first receptacle diameter, an axially oriented slot 144 formed in the sidewall 142, and an endwall 146. With regard to the first type of trailer brake plug 12, the first receptacle diameter of the cylindrically shaped sidewall 142 is about that of the first plug diameter of the cylindrical shape of the sidewall 12*a* of the first type of trailer brake plug 12. In this regard, the alignment tab 12*b* of the first type of trailer plug 12 is received into the slot 144 when the first type of trailer plug is inserted into the second plug receptacle 106*b*.

The third plug receptacle 106*c* is preferred to have a cylindrically shaped sidewall 148 defined by a second receptacle diameter and an endwall 150, wherein the first receptacle diameter is larger than the second receptacle diameter. With regard to the second type of trailer brake plug 12, the second receptacle diameter of the cylindrically shaped sidewall 148 is about that of the second plug diameter of the cylindrical shape of the sidewall 14*a* of the second type of trailer brake plug 14. In this regard, since the alignment tab 14*b* is not as pronounced as that of the alignment tab 12*b* of the first type of trailer brake plug 12, there is preferably no need for a slot to be formed in the sidewall 148, wherein the second type of trailer plug 14 causes pliant deformation of the boot 102 as the second type of trailer plug is inserted into the third plug receptacle 106*c*.

For purposes of reduced boot material requirement and yet maintenance of structural strength, inserts 132*a*, 132*b* are preferably provided in the boot 102 between the first and second plug receptacles 106*a*, 106*b* and the foot 124.

A dimensional example will now be given as an aid to an artisan to effect making the trailer accessory 100, wherein it is to be noted that the dimensions are by way of exemplification only and not limitation.

The base 104 is about 3.5 inches by 8 inches, about 0.5 inch thick, and has recesses for eliminating weight and saving material having a depth about 0.25 inch. The central aperture 126 is about 2.5 inches by 1.25 inches. The outboard slots 118*a*, 118*b* are about 1 inch by 3.2 inches. The inboard slots 130*a*, 130*b* are about 1.5 by 0.5 inches, and are about 2 inches apart at their closest. The cross-bar is about 5 inches by 0.75 inches, and the end slots 134*a*, 134*b* are sized and spaced apart as above indicated for the inboard slots 130*a*, 130*b*. The thickness of the foot 124 of the boot is about 1/32 inch greater than the depth of the recesses of the base. The sidewalls 136*a*, 136*b* of the first plug receptacle 106*a* are separated by about 5/16 inch, the edgewalls 138*a*, 138*b* are mutually separated by about 1.25 inches at the maximum therebetween, and the depth of the first plug receptacle is about 1 inch from the opening thereof to the endwall 140 thereof, wherein the opening is provided with peripheral beveling 152. The second plug receptacle 106*b* has a first receptacle diameter of about 1 and 5/8 inches, the slot 144 is about 1/16 inch in depth and the depth of the first plug receptacle is about 1 inch from the opening thereof to the endwall 146 thereof, with convex radiusing 154 adjacent the endwall and peripheral beveling 156 at the opening. The third plug receptacle 106*c* has a second receptacle diameter of about 15/16 inch and a depth of about 1 inch from the opening thereof to the endwall 150 thereof, with peripheral beveling 158 at the opening. The thickness of the sidewalls of the first, second and third plug receptacles is about 3/16 inch.

With respect to any of the foregoing first, second and third plug receptacles 106*a*, 106*b*, 106*c*, the shape thereof is preselected to reciprocably match the sidewall shape of the intended trailer plug into which it is to be received so that the trailer plug is protected from weather.

Referring particularly to FIGS. 2 and 3 operation of the trailer accessory 100 will now be discussed. The user clamps the base 104 to the tongue 110 of a trailer 108, spaced a convenient distance from the socket 105 thereof, whereby the ends 120*a* of the trailer chains 120 are able to reach, respectively, the first and second outboard slots 118*a*, 118*b*. The trailer lighting plug 10 is inserted into the first plug receptacle 106*a*, and the particular trailer brake plug 12, 14, as the case may be, is inserted into its appropriate second or third plug receptacle 106*b*, 106*c*. The ends 120*a* of the trailer chains are draped into or clipped onto, respectively, each of the outboard slots 118*a*, 118*b*. Finally, the looped end 122*a* of the break-away cable 122 is looped over the boot 102.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A trailer accessory for being connected to the tongue of a trailer, said trailer accessory comprising:

a pinless boot composed of pliant material, said boot having at least one plug receptacle formed therein;

a base connected with said boot; and connection member means for connecting said base to the tongue of a trailer;

wherein said at least one plug receptacle has a predetermined shape for protectably receiving therein a selected trailer plug.

2. The trailer accessory of claim 1, wherein said at least one plug receptacle comprises:

a first plug receptacle for protectably receiving thereinside a trailer lighting plug; and a second plug receptacle for protectably receiving thereinside a first type of trailer brake plug.

3. The trailer accessory of claim 2, wherein said at least one plug receptacle further comprises:

a third plug receptacle for protectably receiving thereinside a second type of trailer brake plug.

4. The trailer accessory of claim 3, wherein said boot has a foot; wherein said second and third plug receptacles are mutually axially aligned and are open in mutually opposite first and second directions; wherein said first plug receptacle is located between said third plug receptacle and said foot; and wherein said first and third plug receptacles are open in said second direction.

5. The trailer accessory of claim 4, wherein said first plug receptacle has a generally parallelepipedal shape; said second plug receptacle has a generally cylindrical shape defined by a first receptacle diameter; and said third plug receptacle has a generally cylindrical shape defined by a second receptacle diameter, wherein said first receptacle diameter is larger than said second receptacle diameter.

6. The trailer accessory of claim 5, further comprising means on said base for supporting trailer chains.

7. The trailer accessory of claim 6, wherein said means for supporting trailer chains comprises first and second outboard slots provided in said base.

8. The trailer accessory of claim 7, wherein said base has a central aperture; said foot having mutually opposing overhangs, wherein said central aperture is sized in relation to said foot such that said overhangs interferingly abut said base adjacent said central aperture to thereby connect said boot to said base.

9. The trailer accessory of claim 8, wherein said connection member means comprises:

said base having first and second inboard slots formed in said base juxtaposed said central aperture, said first and second inboard slots having predetermined sizing and spacing therebetween;

a cross-bar having first and second end slots sized and spaced substantially similarly to said sizing and spacing of said first and second inboard slots; and a pair of threaded fasteners, a threaded fastener thereof being slidably engaged with each of said first inboard slot and said first end slot, and the other threaded fastener thereof being slidably engaged with each of said second inboard slot and said second end slot.

10. The trailer accessory of claim 9, wherein said foot has a bottom protruding in relation to said base, whereby said bottom provides a non-slip surface for contacting the tongue of a trailer when said pair of threaded fasteners are tightened.

11. The trailer accessory of claim 1, further comprising means on said base for supporting trailer chains.

12. The trailer accessory of claim 11, wherein said means for supporting trailer chains comprises first and second outboard slots provided in said base.

13. The trailer accessory of claim 1, wherein said base has a central aperture; further wherein said boot has a foot, said foot having mutually opposing overhangs, wherein said central aperture is sized in relation to said foot such that said overhangs interferingly abut said base adjacent said central aperture to thereby connect said boot to said base.

14. The trailer accessory of claim 1, wherein said connection member means comprises:

said base having first and second inboard slots formed in said base juxtaposed said central aperture, said first and second inboard slots having predetermined sizing and spacing therebetween;

a cross-bar having first and second end slots sized and spaced substantially similarly to said sizing and spacing of said first and second inboard slots; and a pair of threaded fasteners, a threaded fastener thereof being slidably engaged with each of said first inboard slot and said first end slot, and the other threaded fastener thereof being slidably engaged with each of said second inboard slot and said second end slot.

15. The trailer accessory of claim 14, wherein said boot has a foot, said foot has a bottom protruding in relation to said base, whereby said bottom provides a non-slip surface for contacting the tongue of a trailer when said pair of threaded fasteners are tightened.

16. A trailer accessory for being connected to the tongue of a trailer, said trailer accessory comprising:

a boot composed of pliant material, said boot having a plurality of plug receptacles formed therein, said plurality of plug receptacles comprising:

a first plug receptacle for protectably receiving thereinside a trailer lighting plug;

a second plug receptacle for protectably receiving thereinside a first type of trailer brake plug; and a third plug receptacle for protectably receiving thereinside a second type of trailer brake plug;

a base connected with said boot;

means on said base for supporting trailer chains; and connection member means for connecting said base to the tongue of a trailer.

17. The trailer accessory of claim 16, wherein said boot has a foot; wherein said second and third plug receptacles are mutually axially aligned and are open in mutually opposite first and second directions; wherein said first plug receptacle is located between said third plug receptacle and said foot; wherein said first and third plug receptacles are open in said second direction; wherein said first plug receptacle has a generally parallelepipedal shape; said second plug receptacle has a generally cylindrical shape defined by a first receptacle diameter; and wherein said third plug receptacle has a generally cylindrical shape defined by a second receptacle diameter, wherein said first receptacle diameter is larger than said second receptacle diameter.

18. The trailer accessory of claim 17, wherein said base has a central aperture, further wherein:

said foot having mutually opposing overhangs, wherein said central aperture is sized in relation to said foot such that said overhangs interferingly abut said base adjacent said central aperture to thereby connect said boot to said base.

19. The trailer accessory of claim 18, wherein said connection member means comprises:

said base having first and second inboard slots formed in said base juxtaposed said central aperture, said first and second inboard slots having predetermined sizing and spacing therebetween;

a cross-bar having first and second end slots sized and spaced substantially similarly to said sizing and spacing of said first and second inboard slots; and a pair of threaded fasteners, a threaded fastener thereof being slidably engaged with each of said first inboard slot and said first end slot, and the other threaded fastener thereof being slidably engaged with each of said second inboard slot and said second end slot.

20. The trailer accessory of claim 19, wherein said foot has a bottom protruding in relation to said base, whereby said bottom provides a non-slip surface for contacting the tongue of a trailer when said pair of threaded fasteners are tightened.

21. A trailer accessory for being connected to the tongue of a trailer, said trailer accessory comprising:

a boot composed of pliant material, said boot having at least one plug receptacle formed therein;

a base connected with said boot; and connection member means for connecting said base to the tongue of a trailer;

wherein said at least one plug receptacle has a predetermined shape for protectably receiving therein a selected trailer plug;

wherein said at least one plug receptacle comprises:
 a first plug receptacle for protectably receiving thereinside a trailer lighting plug; and
 a second plug receptacle for protectably receiving thereinside a first type of trailer brake plug; and wherein said at least one plug receptacle further comprises:
 a third plug receptacle for protectably receiving thereinside a second type of trailer brake plug.

* * * * *